(12) United States Patent
Kimata

(10) Patent No.: US 8,094,709 B2
(45) Date of Patent: Jan. 10, 2012

(54) EQUALIZER AND EQUALIZATION METHOD

(75) Inventor: Masayuki Kimata, Tokyo (JP)

(73) Assignee: NEC Corporation, Tokyo (JP)

( * ) Notice: Subject to any disclaimer, the term of this patent is extended or adjusted under 35 U.S.C. 154(b) by 712 days.

(21) Appl. No.: 12/278,098

(22) PCT Filed: Jan. 26, 2007

(86) PCT No.: PCT/JP2007/051745
§ 371 (c)(1),
(2), (4) Date: Aug. 1, 2008

(87) PCT Pub. No.: WO2007/088953
PCT Pub. Date: Aug. 9, 2007

(65) Prior Publication Data
US 2009/0022217 A1     Jan. 22, 2009

(30) Foreign Application Priority Data

Feb. 1, 2006  (JP) .................. 2006-024012

(51) Int. Cl.
*H03H 7/40*  (2006.01)
*H03H 7/30*  (2006.01)
(52) U.S. Cl. .......... 375/232; 375/229; 375/346
(58) Field of Classification Search .......... 375/232, 375/229, 350, 346, 260; 370/208; 708/322, 708/323
See application file for complete search history.

(56) References Cited

U.S. PATENT DOCUMENTS

| 2005/0036541 | A1* | 2/2005 | McKown | 375/233 |
|---|---|---|---|---|
| 2005/0259721 | A1* | 11/2005 | Kawamoto et al. | 375/144 |
| 2006/0029144 | A1* | 2/2006 | Dabak et al. | 375/260 |
| 2006/0203932 | A1* | 9/2006 | Palanki et al. | 375/295 |
| 2007/0002985 | A1* | 1/2007 | Kimata et al. | 375/350 |
| 2007/0071071 | A1* | 3/2007 | Li et al. | 375/147 |
| 2007/0110200 | A1* | 5/2007 | Mergen et al. | 375/350 |
| 2007/0147529 | A1* | 6/2007 | Bocquet | 375/260 |

FOREIGN PATENT DOCUMENTS

| JP | 2005328311 A | 11/2005 |
|---|---|---|
| JP | 2005533460 A | 11/2005 |
| WO | 2005078949 A1 | 8/2005 |

OTHER PUBLICATIONS

David Falconer et al., "Frequency Domain Equalization for Single-Carrier Broadband Wireless Systems", Apr. 2002, pp. 58-66, IEEE Communications Magazine.

Mariko Matsumoto et al., "Accurate Channel Separation Schemes in MSSE-based Chip Equalizer for HSDPA Mobile Terminals", 2005, p. 569, The Institute of Electronics, Information and Communication Engineers General Conference, B-5-120.

* cited by examiner

*Primary Examiner* — Chieh M Fan
*Assistant Examiner* — Aristocratis Fotakis

(57) ABSTRACT

A correction coefficient calculating section 20 calculates a correction coefficient $\beta$ so as to obtain a noise power equivalent to detected path and adjacent path transmission channel estimation values. A noise power correcting section 21 calculates a corrected noise power $\beta N0$. A weight calculating section 8 receives as its input a frequency-domain transmission channel estimation value $H(f)$ being an output of an FFT section 7 and the noise power $\beta N0$ corrected by the noise power correcting section 21 and calculates a weight of an equalization filter by MMSE.

5 Claims, 4 Drawing Sheets

EQUALIZER AND EQUALIZATION METHOD

TECHNICAL FIELD

This invention relates to an equalizer and an equalization method and relates to the equalizer and the equalization method for performing equalization of a received signal by calculating an equalization weight according to the minimum mean square error method (MMSE) using a transmission channel response vector based on transmission channel estimation in time domain.

BACKGROUND ART

In the wireless communication systems for next-generation mobile communications, it is important to realize high-speed data transmission. However, as the data rate increases, interference between symbols due to multipaths, i.e. multipath interference, arises as a problem. There are various methods for suppressing this multipath interference. There is a linear equalizer as a relatively simple method and a frequency equalizer is proposed for carrying out this equalization process in frequency domain. For example, see prior art document 1 (D. Falconer, S. L. Ariyavisitakul, A. Benyamin-Seeyar, and B. Eidson, "Frequency Domain Equalization for Single-Carrier Broadband Wireless Systems," IEEE Commun. Mag., vol. 40, no. 4, pp. 58-66, April 2002.).

FIG. 1 shows one example of the configuration of a conventional equalizer in which a plural path samples method described in prior art document 2 (Matsumoto, Yoshida, and Ushirokawa, "Study of Accurate Channel Separation Method in MMSE Chip Equalizer for HSDPA Terminal" 2005 The Institute of Electronics, Information and Communication Engineers General Conference, B-5-120.) is applied to a frequency equalizer described in the above prior art document 1. The conventional equalizer comprises a receiving antenna 1, a path timing detecting section 2, a detected path transmission channel estimating section 3, an adjacent path transmission channel estimating section 4, a transmission channel response vector generating section 5, serial/parallel (S/P) converting sections 6 and 10, fast Fourier transform (FFT) sections 7 and 11, a weight calculating section 8, a guard interval (GI) removing section 9, an equalization filter 12, an inverse fast Fourier transform (IFFT) section 13, a parallel/serial (P/S) converting section 14, and a noise power estimating section 15.

The equalizer to which the plural path samples method is applied has a feature that each path is represented by a plurality of transmission channel estimation value samples, thereby improving the equalization characteristics in an environment where paths exist close to each other and providing tolerance to path timing errors.

The receiving antenna 1 receives a digitally modulated single-carrier signal. The path timing detecting section 2 receives as its input an oversampled received signal and detects the timings of a plurality of paths using pilot signals included in the received signal. As a method of detecting the timings, use is made of a method of detecting the timings of a plurality of paths having high levels based on the results of detection of sliding correlation between pilot signals included in the received signal and a known pilot signal sequence, or the like. The detected path transmission channel estimating section 3 receives as its input the oversampled received signal and the path timings detected by the path timing detecting section 2 and estimates transmission channel estimation values at the timings of the detected paths using the pilot signals included in the received signal.

The adjacent path transmission channel estimating section 4 receives as its input the oversampled received signal and the path timings detected by the path timing detecting section 2 and, using the pilot signals included in the received signal, estimates transmission channel estimation values at a plurality of timings (adjacent path timings) before and after each of the detected path timings. The transmission channel response vector generating section 5 receives as its input the transmission channel estimation values estimated by the detected path transmission channel estimating section 3 and the adjacent path transmission channel estimating section 4 and generates a transmission channel response vector.

FIG. 2 is a diagram showing the state of generation of a transmission channel response vector in the transmission channel response vector generating section 5. A solid line represents a transmission channel estimation value at a detected path timing and a broken line represents a transmission channel estimation value at an adjacent path timing. A transmission channel response vector is generated by concatenating the transmission channel estimation values at the detected path timings and the adjacent path timings (transmission channel estimation values of plural path samples).

The S/P converting section 6 performs S/P conversion of the transmission channel response vector generated by the transmission channel response vector generating section 5. The FFT section 7 receives as its input the transmission channel response vector converted by the S/P converting section 6 and outputs a transmission channel estimation value converted into frequency domain. The noise power estimating section 15 receives as its input the oversampled received signal and the transmission channel estimation values estimated by the detected path transmission channel estimating section 3 and estimates a noise power.

The weight calculating section 8 receives as its input the frequency-domain transmission channel estimation value being the output of the FFT section 7 and the noise power estimated by the noise power estimating section 15 and calculates a weight of the equalization filter by the minimum mean square error method (MMSE). Given that a transmission channel estimation value at a subcarrier f used for converting the transmission channel response vector into frequency domain in the FFT section 7 is H(f), a weight W(f) of the equalization filter is expressed by the following formula (1).

$$W(f) = \frac{H*(f)}{|H(f)|^2 + N_0} \quad (1)$$

where * represents a complex conjugate and N0 represents a noise power estimated by the noise power estimating section 15.

The GI removing section 9 receives as its input the oversampled received signal and removes a portion, corresponding to GI, of the received signal. The S/P converting section 10 performs S/P conversion of the received signal with GI removed by the GI removing section 9. The FFT section 11 receives as its input the received signal converted by the S/P converting section 10 and converts it into frequency domain. The equalization filter 12 receives as its input the equalization weight calculated by the weight calculating section 8 and the received signal frequency-converted by the FFT section 11 and performs equalization of the received signal in frequency domain.

The IFFT section 13 receives as its input a frequency-domain equalized signal being an output of the equalization filter 12 and converts it into time domain using IFFT. The P/S converting section 14 performs P/S conversion of the signal converted into time domain and outputs a demodulated signal.

DISCLOSURE OF THE INVENTION

Problem to be Solved by the Invention

The conventional equalizer has the following problem. In the weight calculating section 8, the noise power calculated from the oversampled received signal and the transmission channel estimation values estimated by the detected path transmission channel estimating section 3 is used for calculating the weight of the equalization filter. However, in the case where an equalization weight is calculated using a transmission channel response vector generated by concatenating transmission channel estimation values estimated by the detected path transmission channel estimating section 3 and the adjacent path transmission channel estimating section 4 as in the plural path samples method, there is a problem that the accuracy of the MMSE weight deviates and thus the equalization performance degrades.

It is an object of this invention to provide an equalizer and an equalization method that can realize excellent equalization characteristics by performing accurate MMSE control in the equalizer where an equalization weight is calculated using a transmission channel response vector in which transmission channel estimation values at a detected path timing and its adjacent path timing are concatenated.

Means for Solving the Problem

An equalizer according to a first mode of this invention is an equalizer comprising an equalization filter for receiving and equalizing a digitally modulated single-carrier signal and a weight calculating section for calculating an equalization weight of the equalization filter using a transmission channel response vector in which a transmission channel estimation value at a detected path timing of the received signal (detected path transmission channel estimation value) and a transmission channel estimation value at an adjacent path timing thereof (adjacent path transmission channel estimation value) are concatenated, and is characterized by comprising means for correcting a noise power for use in calculation of the equalization weight by a correction coefficient generated using the detected path transmission channel estimation value and the adjacent path transmission channel estimation value.

An equalizer according to a second mode of this invention is an equalizer that receives a digitally modulated single-carrier signal and calculates an equalization weight using a transmission channel response vector in which transmission channel estimation values at a detected path timing and its adjacent path timing are concatenated, and is characterized by comprising a path timing detecting section for detecting a timing of an L (L is an integer equal to or greater than 1) path using a pilot signal included in the received signal oversampled, a detected path transmission channel estimating section for estimating a transmission channel estimation value at the detected path timing, an adjacent path transmission channel estimating section for estimating transmission channel estimation values at adjacent path timings of Nps (Nps is an integer equal to or greater than 1) samples before and after the detected path timing, a transmission channel response vector generating section for generating a transmission channel response vector based on the detected path and adjacent path transmission channel estimation values, a noise power estimating section for estimating a noise power N0 using the received signal and the detected path transmission channel estimation value, a correction coefficient calculating section for calculating a correction coefficient β so as to obtain a noise power equivalent to the detected path and adjacent path transmission channel estimation values, a noise power correcting section for calculating a corrected noise power βN0 using the noise power N0 estimated by the noise power estimating section and the correction coefficient β calculated by the correction coefficient calculating section, a weight calculating section for calculating an equalization weight by a minimum mean square error method using the transmission channel response vector and the corrected noise power, and an equalization filter for performing equalization of the received signal using the equalization weight.

An equalization method according to a third mode of this invention is an equalization method comprising a step of receiving a digitally modulated single-carrier signal and performing equalization thereof by an equalization filter and a weight calculation step of calculating an equalization weight of the equalization filter using a transmission channel response vector in which a transmission channel estimation value at a detected path timing of the received signal (detected path transmission channel estimation value) and a transmission channel estimation value at an adjacent path timing thereof (adjacent path transmission channel estimation value) are concatenated, and is characterized by comprising a correction step of correcting a noise power for use in calculation of the equalization weight by a correction coefficient generated using the detected path transmission channel estimation value and the adjacent path transmission channel estimation value.

An equalization method according to a fourth mode of this invention is an equalization method that receives a digitally modulated single-carrier signal and calculates an equalization weight using a transmission channel response vector in which transmission channel estimation values at a detected path timing and its adjacent path timing are concatenated, and is characterized by detecting a timing of an L (L is an integer equal to or greater than 1) path using a pilot signal included in the received signal oversampled, estimating a transmission channel estimation value at the detected path timing, estimating transmission channel estimation values at adjacent path timings of Nps (Nps is an integer equal to or greater than 1) samples before and after the detected path timing, generating a transmission channel response vector based on the detected path and adjacent path transmission channel estimation values, estimating a noise power N0 using the received signal and the detected path transmission channel estimation value, calculating a correction coefficient β so as to obtain a noise power equivalent to the detected path and adjacent path transmission channel estimation values, calculating a corrected noise power βN0 using the noise power N0 and the correction coefficient β, calculating an equalization weight by a minimum mean square error method using the transmission channel response vector and the corrected noise power, and performing equalization of the received signal using the equalization weight.

Effect of the Invention

According to this invention, in order to perform accurate MMSE control in an equalizer where an equalization weight is calculated using a transmission channel response vector in which transmission channel estimation values at a detected path timing and its adjacent path timing are concatenated, a noise power for use in calculation of the weight of an equalization filter is corrected so as to be a noise power equivalent to the detected path and adjacent path transmission channel estimation values to thereby calculate the weight of the equalization filter, so that excellent equalization characteristics can be realized.

BEST MODE FOR CARRYING OUT THE INVENTION

Figure 1:
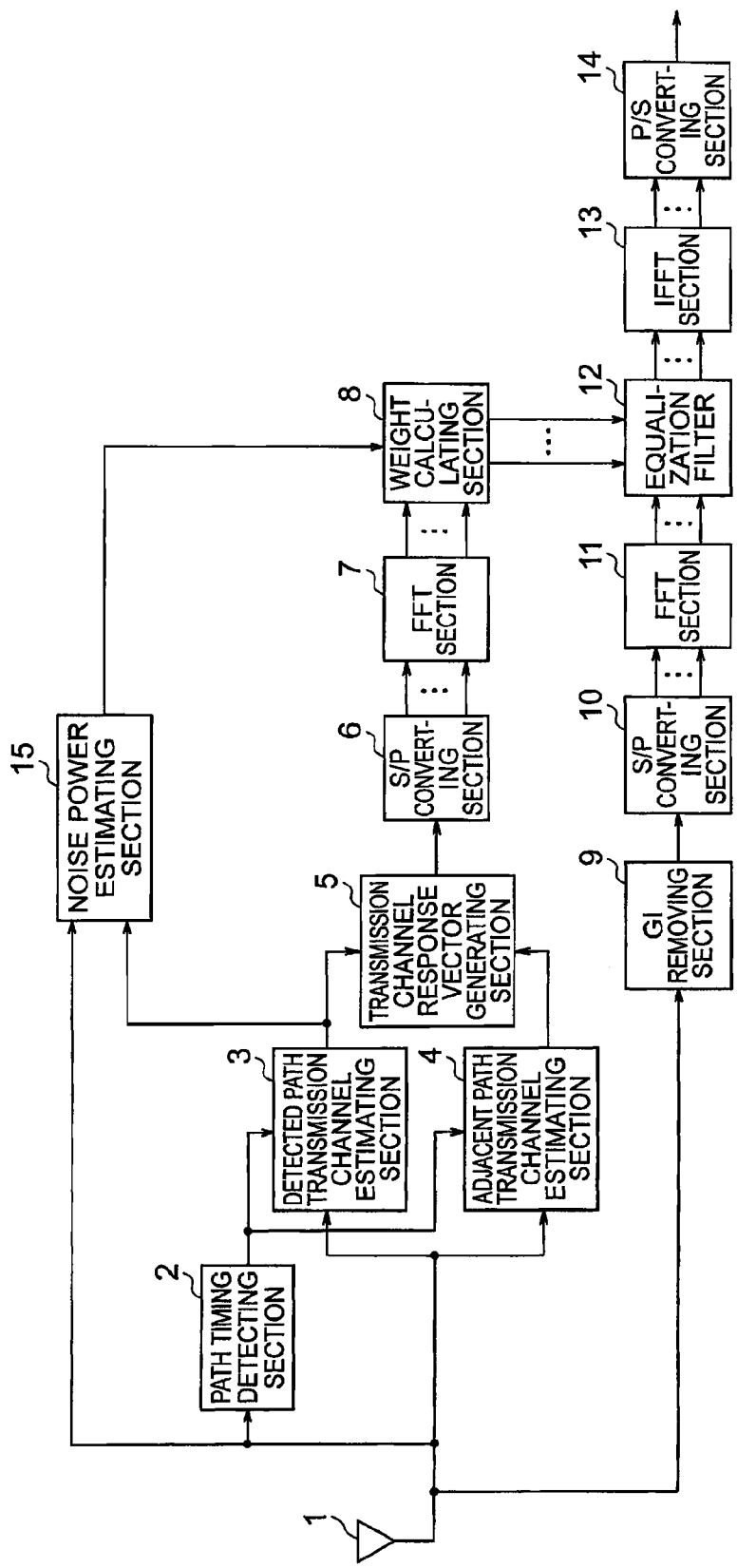
FIG. 1 is a configuration diagram showing one example of a conventional equalizer.
Figure 2:
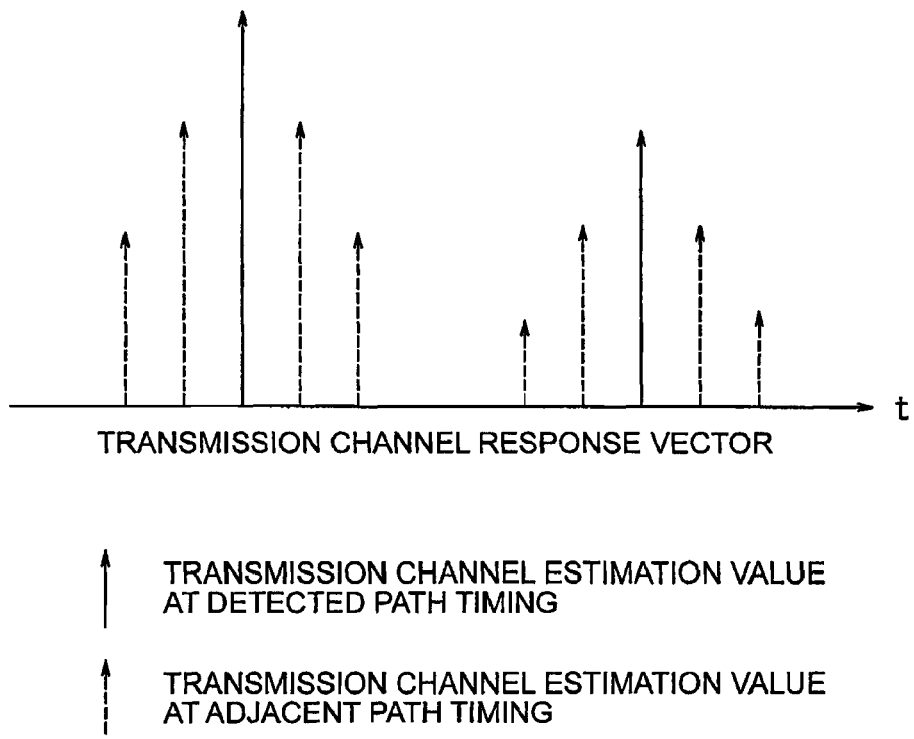
FIG. 2 is a diagram showing the state of generation of a transmission channel response vector in a transmission channel response vector generating section 5.
Figure 3:
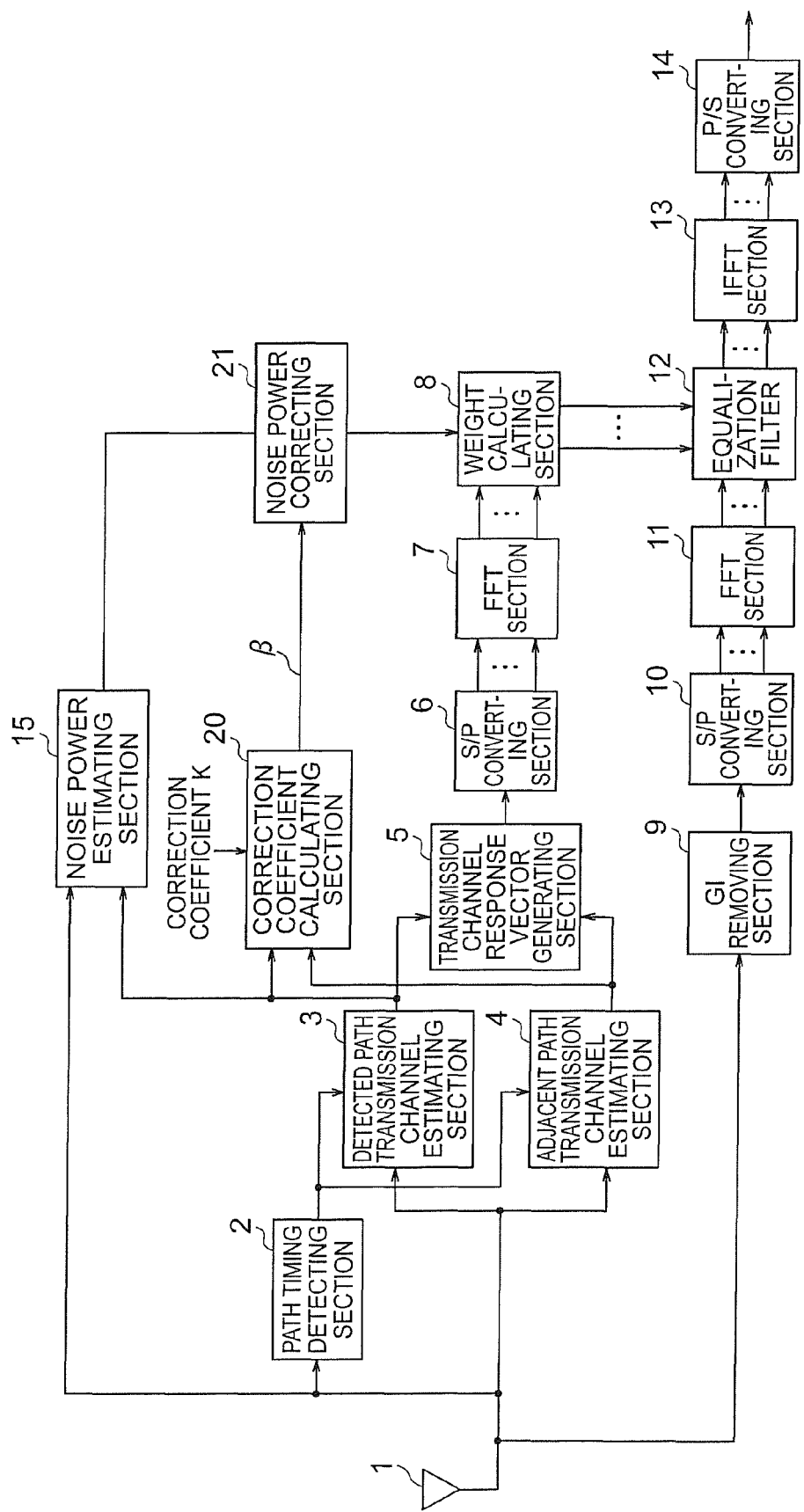
FIG. 3 is a configuration diagram showing an embodiment of an equalizer of this invention.

Next, an embodiment of this invention will be described in detail with reference to the drawings. FIG. 3 is a configuration diagram showing an embodiment of an equalizer of this invention, wherein the same portions as those in FIG. 1 are assigned the same symbols. As shown in FIG. 3, the equalizer of this invention comprises a receiving antenna 1, a path timing detecting section 2, a detected path transmission channel estimating section 3, an adjacent path transmission channel estimating section 4, a transmission channel response vector generating section 5, S/P converting sections 6 and 10, FFT sections 7 and 11, a weight calculating section 8, a GI removing section 9, an equalization filter 12, an IFFT section 13, a P/S converting section 14, a noise power estimating section 15, a correction coefficient calculating section 20, and a noise power correcting section 21.

The receiving antenna 1 receives a digitally modulated single-carrier signal. The path timing detecting section 2 receives as its input an oversampled received signal and detects the timings of L (L is an integer equal to or greater than 1) paths using pilot signals included in the received signal. As a method of detecting the timings, use is made of a method of detecting the timings of a plurality of paths having high levels based on the results of detection of sliding correlation between pilot signals included in the received signal and a known pilot signal sequence, or the like.

The detected path transmission channel estimating section 3 receives as its input the oversampled received signal and the path timings detected by the path timing detecting section 2 and estimates transmission channel estimation values at the timings of the detected paths using the pilot signals included in the received signal. The adjacent path transmission channel estimating section 4 receives as its input the oversampled received signal and the path timings detected by the path timing detecting section 2 and, using the pilot signals included in the received signal, estimates transmission channel estimation values at adjacent path timings of Nps (Nps is an integer equal to or greater than 1) samples before and after each of the detected path timings.

The transmission channel response vector generating section 5 receives as its input the transmission channel estimation values estimated by the detected path transmission channel estimating section 3 and the adjacent path transmission channel estimating section 4 and generates a transmission channel response vector by concatenating the transmission channel estimation values at the detected path timings and the adjacent path timings. The S/P converting section 6 performs S/P conversion of the transmission channel response vector generated by the transmission channel response vector generating section 5. The FFT section 7 receives as its input the transmission channel response vector converted by the S/P converting section 6 and outputs a transmission channel estimation value converted into frequency domain.

The noise power estimating section 15 receives as its input the oversampled received signal and the transmission channel estimation values estimated by the detected path transmission channel estimating section 3 and estimates a noise power N0. Although there are various noise power estimation methods, specific configuration and explanation thereof are omitted because of no direct relation to this invention.

The correction coefficient calculating section 20 receives as its input the transmission channel estimation values estimated by the detected path transmission channel estimating section 3 and the adjacent path transmission channel estimating section 4 and a correction coefficient K (K is an arbitrary real number) and calculates a correction coefficient $\beta$ so as to obtain a noise power equivalent to the detected path and adjacent path transmission channel estimation values. The noise power correcting section 21 receives as its input the noise power N0 estimated by the noise power estimating section 15 and the correction coefficient $\beta$ calculated by the correction coefficient calculating section 20 and calculates a corrected noise power $\beta$N0.

Figure 4:
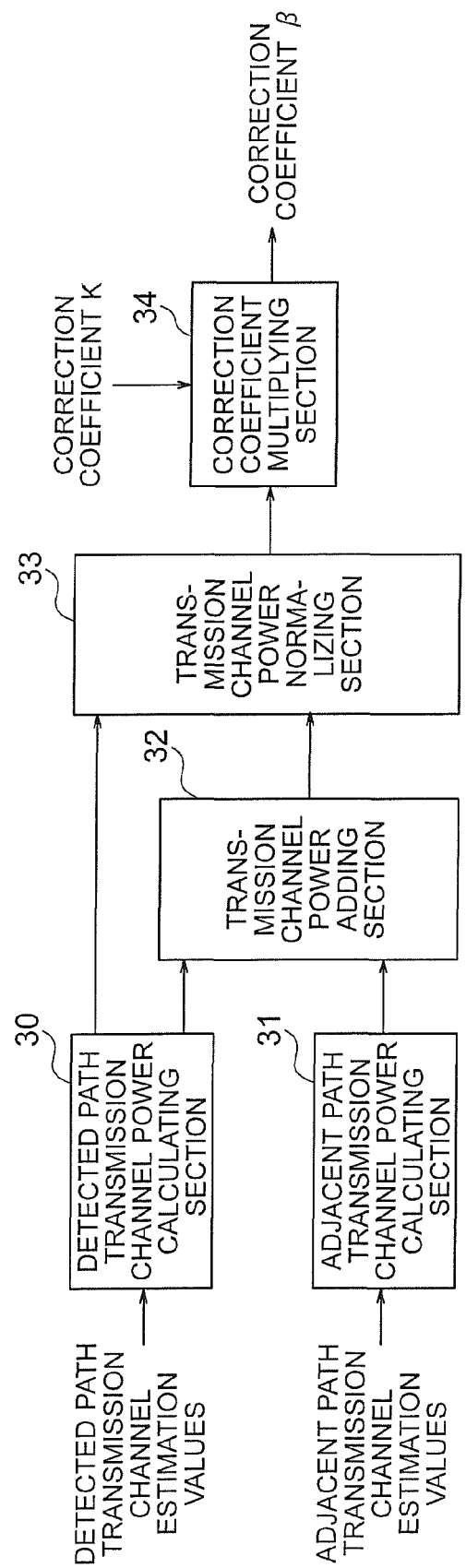
FIG. 4 is a block diagram showing the configuration of a correction coefficient calculating section 20 of this invention.

FIG. 4 is a block diagram showing the configuration of the correction coefficient calculating section 20. The correction coefficient calculating section 20 comprises a detected path transmission channel power calculating section 30, an adjacent path transmission channel power calculating section 31, a transmission channel power adding section 32, a transmission channel power normalizing section 33, and a correction coefficient multiplying section 34. The detected path transmission channel power calculating section 30 receives as its input the transmission channel estimation values estimated by the detected path transmission channel estimating section 3 of FIG. 3 and calculates a detected path transmission channel power. The adjacent path transmission channel power calculating section 31 receives as its input the transmission channel estimation values estimated by the adjacent path transmission channel estimating section 4 of FIG. 3 and calculates an adjacent path transmission channel power.

The transmission channel power adding section 32 receives as its input the detected path transmission channel power and the adjacent path transmission channel power calculated by the detected path transmission channel power calculating section 30 and the adjacent path transmission channel power calculating section 31 and calculates the sum of the detected path and adjacent path transmission channel powers. The transmission channel power normalizing section 33 receives as its input the detected path transmission channel power calculated by the detected path transmission channel power calculating section 30 and the sum of the detected path and adjacent path transmission channel powers calculated by the transmission channel power adding section 32 and normalizes (divides) the sum of the detected path and adjacent path transmission channel powers by the detected path transmission channel power.

The correction coefficient multiplying section 34 receives as its input the transmission channel power normalized by the transmission channel power normalizing section 33 and the correction coefficient K and multiplies the normalized transmission channel power by the correction coefficient K, thereby calculating the correction coefficient $\beta$ so as to obtain a noise power equivalent to the detected path and adjacent path transmission channel estimation values. Given that a detected path transmission channel estimation value at a path l ($1 \leq l \leq L$) is $h_{l,0}$ and its adjacent path transmission channel estimation value is $h_{l,n}$ ($-Nps \leq n \leq Nps$), the correction coefficient $\beta$ is derived by the following formula (2).

$$\beta = K \cdot \frac{\sum_{l=1}^{L} \sum_{n=-Nps}^{Nps} |h_{l,n}|^2}{\sum_{l=1}^{L} |h_{l,0}|^2} \quad (2)$$

The weight calculating section 8 receives as its input the frequency-domain transmission channel estimation value H(f) being the output of the FFT section 7 and a noise power $\beta N0$ corrected by the noise power correcting section 21 and calculates a weight W(f) of the equalization filter by the minimum mean square error method (MMSE), using the following formula (3).

$$W(f) = \frac{H*(f)}{|H(f)|^2 + \beta N_0} \quad (3)$$

The GI removing section 9 receives as its input the oversampled received signal and removes a portion, corresponding to GI, of the received signal. The S/P converting section 10 performs S/P conversion of the received signal with GI removed by the GI removing section 9. The FFT section 11 receives as its input the received signal converted by the S/P converting section 10 and converts it into frequency domain. The equalization filter 12 receives as its input the equalization weight calculated by the weight calculating section 8 and the received signal frequency-converted by the FFT section 11 and performs equalization of the received signal in frequency domain. The IFFT section 13 receives as its input a frequency-domain equalized signal being an output of the equalization filter 12 and converts it into time domain using IFFT. The P/S converting section 14 performs P/S conversion of the signal converted into time domain and outputs a demodulated signal.

As described above, in this embodiment, the noise power for use in calculation of the weight of the equalization filter is corrected so as to be a noise power equivalent to the detected path and adjacent path transmission channel estimation values to thereby calculate the weight of the equalization filter, so that the accurate MMSE control is enabled and thus the excellent equalization characteristics can be realized.

In this embodiment, the description has been given of the frequency equalizer that generates a transmission channel response vector by the time-domain signal processing and performs equalization by the frequency-domain signal processing, but this invention is also applicable to a chip equalizer that performs equalization by the time-domain signal processing using a similar transmission channel response vector.

This invention has been exemplified by an equalizer assumed to have one transmitting antenna and one receiving antenna, but this invention is also applicable to a MIMO (Multiple Input Multiple Output) system having a plurality of transmitting antennas and a plurality of receiving antennas. Further, this invention is applicable to either a base station wireless apparatus or a mobile station wireless apparatus in a mobile communication system.

What is claimed is:

1. An equalizer comprising an equalization filter for receiving a digitally modulated single-carrier signal as a received signal and equalizing the digitally modulated single-carrier signal and a weight calculating section for calculating an equalization weight of said equalization filter by using a transmission channel response vector in which a detected path transmission channel estimation value at a detected path timing of the received signal and an adjacent path transmission channel estimation value at an adjacent path timing thereof are concatenated, said equalizer further comprising:

a noise power estimating section for estimating a noise power N0 for use in calculation of said equalization weight by using said received signal and said detected path transmission channel estimation value;

a correction coefficient calculating section for calculating a correction coefficient $\beta$ by using said detected path transmission channel estimation value and said adjacent path transmission channel estimation value; and a noise power correcting section for correcting the noise power N0 for use in calculation of said equalization weight by said correction coefficient $\beta$ generated by using said detected path transmission channel estimation value and said adjacent path transmission channel estimation value, said noise power correcting section thereby obtaining a corrected noise power $\beta N0$, wherein said correction coefficient calculating section comprises:

power adding means for calculating a detected path transmission channel power and an adjacent path transmission channel power from said detected path transmission channel estimation value and said adjacent path transmission channel estimation value, respectively, and calculating a sum power of both the detected path transmission channel power and the adjacent path transmission channel power;

normalizing means for normalizing the sum power by said detected path transmission channel power to thereby obtain a normalized transmission channel power; and multiplying means for multiplying the normalized transmission channel power by a predetermined coefficient to generate said correction coefficient $\beta$.

2. An equalizer according to claim 1, wherein said weight calculating section and said equalization filter perform frequency-domain signal processing.

3. An equalizer according to claim 1, wherein said weight calculating section and said equalization filter perform time-domain signal processing.

4. An equalizer that receives a digitally modulated single-carrier signal and calculates an equalization weight by using a transmission channel response vector in which transmission channel estimation values at a detected path timing and its adjacent path timing are concatenated, said equalizer further comprising:

a path timing detecting section for detecting a timing of an L (L is an integer equal to or greater than 1) path using a pilot signal included in an oversampled received signal:

a detected path transmission channel estimating section for estimating a detected path transmission channel estimation value at the detected path timing;

an adjacent path transmission channel estimating section for estimating adjacent path transmission channel estimation values at adjacent path timings of Nps (Nps is an integer equal to or greater than 1) samples before and after said detected path timing;

a transmission channel response vector generating section for generating a transmission channel response vector based on the detected path transmission channel estimation value and the adjacent path transmission channel estimation values;
a noise power estimating section for estimating a noise power N0 for use in calculation of said equalization weight by using said received signal and said detected path transmission channel estimation value;
a correction coefficient calculating section for calculating a correction coefficient $\beta$ by using said detected path transmission channel estimation value and said adjacent path transmission channel estimation values;
a noise power correcting section for calculating a corrected noise power $\beta$N0 by using the noise power N0 estimated by said noise power estimating section and the correction coefficient $\beta$ calculated by said correction coefficient calculating section;
a weight calculating section for calculating an equalization weight by a minimum mean square error method using said transmission channel response vector and said corrected noise power; and
an equalization filter for performing equalization of said received signal using said equalization weight,
wherein said correction coefficient calculating section comprises:
a detected path transmission channel power calculating section for calculating a detected path transmission channel power from the detected path transmission channel estimation value estimated by said detected path transmission channel estimating section;
an adjacent path transmission channel power calculating section for calculating an adjacent path transmission channel power from the adjacent path transmission channel estimation values estimated by said adjacent path transmission channel estimating section;
a transmission channel power adding section for calculating a sum of the detected path transmission channel power and the adjacent path transmission channel power calculated by said detected path transmission channel power calculating section and said adjacent path transmission channel power calculating section;
a transmission channel power normalizing section for normalizing the sum of the detected path transmission channel power and the adjacent path transmission channel powers, calculated by said transmission channel power adding section, by the detected path transmission channel power calculated by said detected path transmission channel power calculating section, said transmission channel power normalizing section thereby obtaining a normalized transmission channel power; and
a correction coefficient multiplying section for multiplying the normalized transmission channel power, normalized by said transmission channel power normalizing section, by a correction coefficient K (K is an arbitrary real number).

5. An equalization method comprising a step of receiving a digitally modulated single-carrier signal as a received signal and performing equalization thereof by an equalization filter and a weight calculation step of calculating an equalization weight of said equalization filter by using a transmission channel response vector in which a detected path transmission channel estimation value at a detected path timing of the received signal and an adjacent path transmission channel estimation value at an adjacent path timing thereof are concatenated, said equalization method further comprising:
a step of estimating a noise power N0 for use in calculation of said equalization weight by using said received signal and said detected path transmission channel estimation value;
a correction coefficient calculating step of calculating a correction coefficient $\beta$ by using said detected path transmission channel estimation value and said adjacent path transmission channel estimation value; and
a noise power correcting step of correcting the noise power N0 for use in calculation of said equalization weight by said correction coefficient $\beta$ generated by using said detected path transmission channel estimation value and said adjacent path transmission channel estimation value, said noise power correcting step thereby obtaining a corrected noise power $\beta$N0,
wherein said correction coefficient calculating step comprises:
a power adding step of calculating a detected path transmission channel power and an adjacent path transmission channel power from said detected path transmission channel estimation value and said adjacent path transmission channel estimation value, respectively, and calculating a sum power of both the detected path transmission channel power and the adjacent path transmission channel power;
a normalizing step of normalizing the sum power by said detected path transmission channel power to thereby obtain a normalized transmission channel power; and
a multiplying step of multiplying the normalized transmission channel power by a predetermined coefficient to generate said correction coefficient $\beta$.

* * * * *